(No Model.) 6 Sheets—Sheet 1.

J. BERESFORD & J. P. BEDSON.
REEL FOR BARBED WIRE.

No. 453,139. Patented May 26, 1891.

Witnesses:—
D. H. Haypood
O. L. Lundgren

Inventors
James Beresford
Joseph Phillip Bedson
By attorneys
Brown & Griswold (No Model.) 6 Sheets—Sheet 2.

J. BERESFORD & J. P. BEDSON.
REEL FOR BARBED WIRE.

No. 453,139. Patented May 26, 1891.

Witnesses:—

Inventors.

(No Model.) 6 Sheets—Sheet 3.

J. BERESFORD & J. P. BEDSON.
REEL FOR BARBED WIRE.

No. 453,139. Patented May 26, 1891.

Witnesses:
D. K. Haywood
C. Lundgren

Inventor:
James Beresford
Joseph Phillips Bedson
By attorneys
Brown & Griswold (No Model.) 6 Sheets—Sheet 4.

J. BERESFORD & J. P. BEDSON.
REEL FOR BARBED WIRE.

No. 453,139. Patented May 26, 1891.

Witnesses:-
D. W. Haywood
O. Lundgren

Inventor:-
James Beresford
Joseph Phillips Bedson
By attorneys
Brown & Griswold (No Model.)

J. BERESFORD & J. P. BEDSON.
REEL FOR BARBED WIRE.

No. 453,139. Patented May 26, 1891.

Witnesses:-

Inventor:-
James Beresford
Joseph Phillips Bedson (No Model.)   6 Sheets—Sheet 6.

J. BERESFORD & J. P. BEDSON.
REEL FOR BARBED WIRE.

No. 453,139.   Patented May 26, 1891.

UNITED STATES PATENT OFFICE.

JAMES BERESFORD, OF CHORLTON-CUM-HARDY, AND JOSEPH PHILLIPS BEDSON, OF MANCHESTER, ASSIGNORS TO JOHN THEWLIS JOHNSON AND HERBERT ALFRED JOHNSON, BOTH OF MANCHESTER, ENGLAND.

REEL FOR BARBED WIRE.

SPECIFICATION forming part of Letters Patent No. 453,139, dated May 26, 1891.

Application filed December 19, 1889. Serial No. 334,331. (No model.)

*To all whom it may concern:*

Be it known that we, JAMES BERESFORD, clerk, of 4 Keppel Road, Chorlton-cum-Hardy, in the county of Lancaster, England, and JOSEPH PHILLIPS BEDSON, civil and mechanical engineer, of Bradford House, Bradford, Manchester, in the county of Lancaster, England, have invented certain new and useful improvements in the reels or spools upon which barbed wire and barbed, pronged, or spiked bands or strips of metal for fencing or other purposes are coiled or wound for the purpose of carriage or transport, of which the following is a specification.

Our invention relates to the reels or spools upon which "barbed wire" and barbed, pronged, or spiked bands or strips of metal for "fencing" or other purposes are coiled or wound for the purpose of carriage or transport; and our invention consists in such reels or spools which will occupy a less amount of space than reels or spools of ordinary construction, containing the same length of barbed wire or barbed, pronged, or spiked bands or strips of metal, or which will contain a greater length of barbed wire or barbed, pronged, or spiked bands or strips of metal than would be contained in reels or spools of ordinary construction which would occupy the same space.

In the accompanying drawings, which illustrate our invention.

According to one part of our invention we form a frame of wood consisting of a piece or pieces of wood, across the ends of which and secured thereto are two other pieces of wood, which latter act as flanges. Across each of the pieces of wood last named we place and secure a plate or plates formed of sheet metal. The said plate or plates of sheet metal we secure to the piece of wood, across which it or they is or are placed, by nails or other suitable means. The metal plates and the pieces of wood last mentioned constitute flanges, between which the barbed wire or barbed, pronged, or spiked band or strip of metal wound upon the reel or spool is coiled. One of the pieces of wood above mentioned acts as a part against which may act the driver or carrier or other part or parts which causes or cause the barbed wire or barbed, pronged, or spiked band or strip of metal to be wound upon the reel or spool. After the barbed wire or barbed, pronged, or spiked band or strip of metal has been wound or coiled upon the reel or spool we secure the corresponding ends of the metal plates together by means of a hoop or hoops, a piece or pieces of wire, cord, string, or rope, or other suitable means, such hoop or hoops or piece or pieces of wire, cord, string, or rope passing through holes formed in the metal plates and outside the coil of barbed wire or barbed, pronged, or spiked band or strip of metal upon the reel or spool, and thus render the metal plates better able to withstand any strain put upon them when the reel or spool is being handled, and also prevent the barbed wire or barbed, pronged, or spiked band or strip of metal upon the reel or spool from becoming uncoiled.

Figure 1:
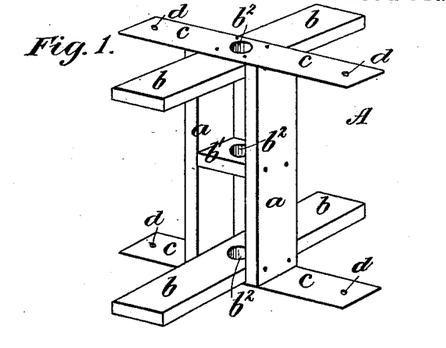
Figures 1, 3, 7, 14, and 16 are perspective views illustrating reels or spools formed according to our invention.
Figure 2:
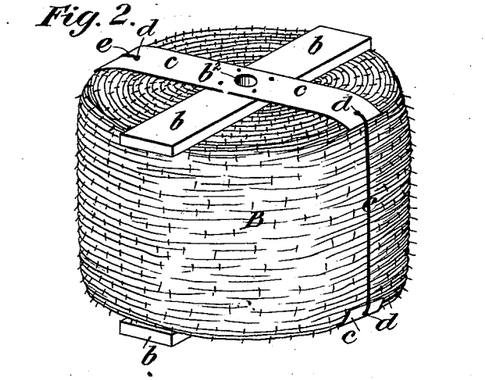
Figs. 2, 6, and 12 are views of reels or spools with barbed wire and barbed, pronged, or spiked bands or strips of metal for fencing or other purposes coiled or wound thereon for the purpose of carriage or transport.

In the accompanying drawings, Fig. 1 is a view of a reel or spool constructed according to this part of our invention. $a\ a$ are pieces of wood, between the ends of which are secured other pieces of wood $b\ b$. The pieces $a\ a$ of wood are also secured to a piece $b'$ of wood, which acts as a strut. The pieces $b\ b$ of wood act as flanges. Across each of the pieces $b\ b$ of wood we place or secure a plate $c$ of sheet metal. Each of the plates $c\ c$ of sheet metal we secure to the piece $b$ of wood, across which it is placed by means of nails or other suitable means. The metal plates $c\ c$ and pieces of wood $b\ b$ constitute flanges between which the barbed wire or barbed, pronged, or spiked band or strip of metal wound upon the reel or spool A is coiled. One of the pieces $b\ b$ of wood acts as a part against which may act the driver or carrier or other part or parts which causes or cause the barbed wire or barbed, pronged, or spiked band or strip of metal to be wound upon the reel or spool A. The mandrel or spindle upon which the reel or spool A is placed when the barbed wire or barbed, pronged, or spiked band or strip of metal is to be wound upon such reel or spool A passes through holes $b^2$, formed in the pieces $b\ b'\ b$ of wood to receive such mandrel or spindle. After the barbed wire or barbed, pronged, or spiked band or strip of metal has been wound or coiled upon the reel or spool A, we secure the corresponding ends of the metal plates $c\ c$ together by means of a hoop or hoops or a piece or pieces of wire, cord, string, or rope $e$ or other suitable means, such hoop or hoops or piece or pieces of wire, cord, string, or rope $e$ passing through holes $d$, formed in the metal plates $c\ c$, and outside the coil B, of barbed wire or barbed, pronged, or spiked band or strip of metal upon the reel or spool A, as shown in Fig. 2. By securing the ends of the metal plates $c\ c$ together we render such metal plates better able to withstand any strain put upon them when the reel or spool A is being handled, and also prevent the barbed wire or barbed, pronged, or spiked band or strip of metal upon the reel or spool A from becoming uncoiled. In cases in which it may be desirable more than one of the plates $c$ of sheet metal may be applied at each end of the reel or spool.

Figure 3:
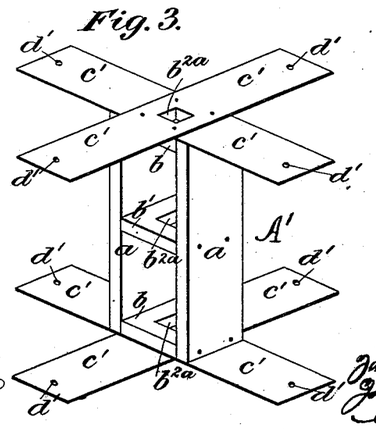

A modification of this part of our invention is shown by Fig. 3 of the accompanying drawings, in which $a\ a$ are pieces of wood, between the ends of which are secured other pieces of wood $b\ b$. Between the pieces $a\ a$ of wood we also place and secure a strutpiece $b'$ of wood. Across each of the pieces of wood $b\ b$ we secure plates $c'\ c'$ of sheet metal. Two, three, or more plates $c'\ c'$ of sheet metal may be employed in conjunction with each of the pieces $b\ b$ of wood. The plates $c'\ c'$ are secured to the pieces of wood, across which they are placed by means of nails, or other suitable means. The metal plates $c'\ c'$ constitute flanges, between which the barbed wire or barbed, pronged, or spiked band or strip of metal wound upon the reel or spool A' is coiled. When the barbed wire or barbed, pronged, or spiked band or strip of metal for fencing, or other purposes is being coiled upon the reel or spool A', we "drive" such reel or spool A' by means of a spindle of a square or other suitable shape, (shown square,) and we form through the metal plates $c'\ c'$ and pieces of wood $b\ b'\ b$ holes $b^{2a}$, of square or other suitable shape, through which the said spindle may pass. We form holes $d'\ d'$ through the metal plates $c'\ c'$, so that after the barbed wire or barbed, pronged, or spiked band or strip of metal has been wound upon the reel or spool A, we may secure the corresponding ends of the metal plates $c'\ c'$ together by means of a hoop or hoops or a piece or pieces of wire, cord, string, or rope, or other suitable means, such hoop or hoops or piece or pieces of wire, cord, string, or rope passing through the holes $d'$ formed in the metal plates $c'\ c'$, to be secured together and outside the coil of barbed wire or barbed, pronged, or spiked band or strip of metal upon the reel or spool A'. In some cases instead of forming the metal plates $c'\ c'$ at each end of the reel or spool from separate pieces of metal we form the plates $c'\ c'$ at each end of the reel or spool from one piece of metal, and in such cases we may cause the metal plates to have three, four, or a greater number of arms.

According to a further part of our invention we form a frame of wood, consisting of two or more pieces of wood nailed or otherwise secured around central pieces through which are formed holes. To the pieces of wood above mentioned we secure bars formed of thin metal, the opposite ends of which are bent outward from the frame so as to act as flanges between which the barbed wire or barbed, pronged, or spiked band or strip of metal wound upon the reel or spool is coiled or wound. We form holes through the ends of the "bars" above mentioned and after the barbed wire or barbed, pronged, or spiked band or strip of metal has been wound or coiled between the flanges formed by the ends of the bars aforesaid we connect the ends of each of such bars by means of a hoop or hoops or a piece or pieces of wire, cord, string, or rope, or other suitable means, such hoop or hoops or piece or pieces of wire, cord, string, or rope passing through the holes formed in the ends of the said bar, or we secure the ends of each of the said bars together by means of a rivet or rivets passing through the ends of such bar, or in any other suitable manner. When the barbed wire or barbed, pronged, or spiked band or strip of metal for fencing or other purposes is being coiled or wound upon the reel or spool, we drive such reel or spool by means of a square or other suitable block or square or other suitable blocks, which passes or pass into a recess or recesses formed at the end or ends of the said reel or spool.

Figure 4:
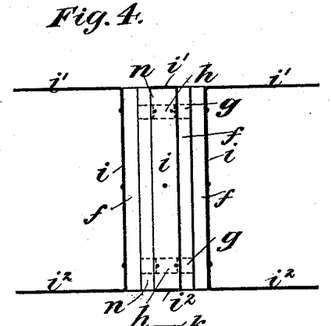
Figs. 4, 8, and 10 are side elevations.
Figure 5:
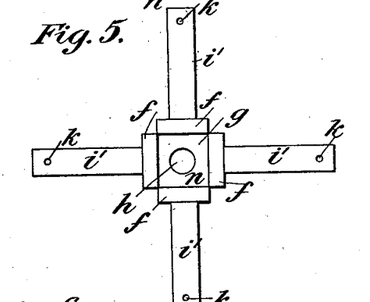
Figs. 5, 9, and 11 are plans of reels or spools formed according to our invention.
Figure 6:
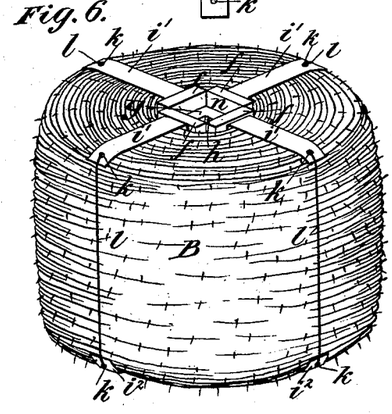
Figure 7:
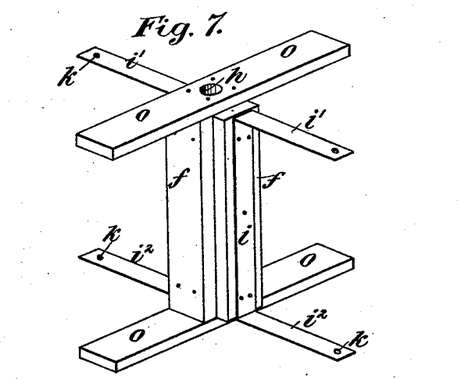

In some cases we employ, in conjunction with the flanges formed by bars of thin metal, cross-pieces of wood, which are secured by nails or other suitable means to the frame of wood above mentioned, such cross-pieces forming, together with the bars of thin metal, flanges, between which the barbed wire or barbed, pronged, or spiked band or strip of metal for fencing or other purposes is coiled or wound. This part of our invention is illustrated by Figs. 4 and 5 of the accompanying drawings, Fig. 4 being an elevation and Fig. 5 a plan of that which is shown in Fig. 4. According to this part of our invention we form a frame of pieces $f\ f$ of wood, nailed or otherwise secured around central pieces $g\ g$, through which are formed holes $h\ h$. To the pieces $f\ f$ of wood above mentioned we secure bars $i$, formed of thin metal, the opposite ends $i'\ i^2$ of which bars $i$ are bent outward from the frame, so as to act as flanges, between which the barbed wire or barbed, pronged, or spiked band or strip of metal wound upon the reel or spool is coiled or wound. We form holes $k$ through the ends of the bars $i$. When the barbed wire or barbed, pronged, or spiked band or strip of metal has been wound or coiled between the flanges formed by the ends $i'\ i^2$ of the bars $i$, we connect the ends $i'\ i^2$ of each of the bars $i$ by means of a hoop or hoops or piece or pieces of wire, cord, string, or rope, or other suitable means $l$, such hoop or hoops or piece or pieces of wire, cord, string, or rope passing through the holes $k$ formed in the ends $i'\ i^2$ of the said bar $i$, as shown in Fig. 6, or we secure the ends $i'\ i^2$ of each bar $i$ together by means of a rivet or rivets passing through the ends $i'\ i^2$ of such bar $i$, or in any other suitable manner. When a rivet or rivets is or are to be so employed, the ends $i'\ i^2$ of each of the bars $i$ must be made sufficiently long to overlap each other. When the barbed wire, or barbed, pronged, or spiked band or strip of metal for fencing or other purposes is being coiled upon the reel or spool, we drive such reel or spool by means of a square or other suitable block or square or other suitable blocks secured upon the spindle of the machine, by means of which the barbed wire or barbed, pronged, or spiked band or strip of metal is coiled upon the reel or spool. The said block or blocks passes or pass into the recess $n$ or recesses $n\ n$, formed at the end or ends of the said reel or spool. In some cases we employ in conjunction with the flanges formed by the ends $i'\ i^2$ of the bars $i\ i$ of thin metal cross-pieces $o$, of wood, as shown in Fig. 7, such cross-pieces $o$ of wood being secured by nails or other suitable means to the frame formed by the pieces of wood $f\ f$, and such cross-pieces $o$ forming, together with the ends $i'\ i^2$ of the bars $i$ of thin metal, flanges between which the barbed wire or barbed, pronged, or spiked band or strip of metal for fencing or other purposes is coiled or wound. In cases in which it may be desirable, more than four of the bars $i\ i$ may be employed in one reel or spool. The bars $i\ i$ which we employ are usually formed from what are known commercially as "sheets" or "hoops;" but such bars may be formed of any suitable metal and be formed in any suitable manner.

Figure 8:
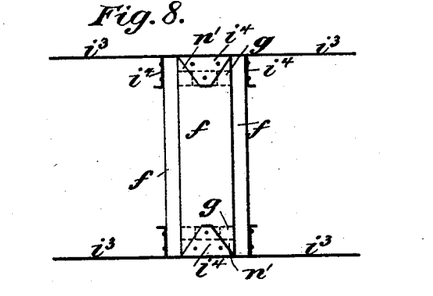
Figure 9:
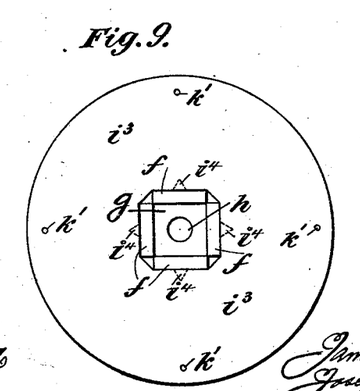

A further part of our invention is shown by Figs. 8 and 9 of the accompanying drawings, Fig. 8 being an elevation and Fig. 9 a plan. According to this part of our invention we form a frame of pieces $f\ f$, of wood, nailed or otherwise secured around central pieces $g\ g$, through which are formed holes $h$. Upon the opposite ends of the pieces of wood $f$ we place metal flanges $i^3$, and we secure the flanges $i^3$ to the pieces $f$ of wood by means of portions $i^4$ to the flanges $i^3$, which after being cut are bent so that when the flanges $i^3$ are placed upon the pieces $f$ of wood, such bent portions $i^4$ of the flanges will be situate against the pieces $f\ f$ of wood, and may be secured thereto by means of nails or other suitable means. In some cases we so bend a portion of one or more or all of the bent portions $i^4$, that the barbed wire or barbed, pronged, or spiked band or strip of metal when wound or coiled upon the reel or spool, will by binding the bent portions $i^4$ against the pieces $f$ of wood assist in securing the flanges $i^3$ upon the pieces $f$ of wood. We form holes $k'$ through the flanges $i^3$. When the barbed wire or barbed, pronged, or spiked band or strip of metal has been wound or coiled between the flanges $i^3$, we connect the flanges $i^3$ by means of a piece or pieces of wire, cord, string, or rope, or other suitable means, such piece or pieces of wire, cord, string, or rope passing through the holes $k'$. When the barbed wire or barbed, pronged, or spiked band or strip of metal for fencing or other purposes is being coiled upon the reel or spool, we drive such reel or spool by means of a square or other suitable block or square or other suitable blocks secured upon the spindle of the machine, by means of which the barbed wire or barbed, pronged, or spiked band or strip of metal is coiled upon the reel or spool, the said block or blocks passing into the recess or recesses $n'\ n'$, formed at the end or ends of the said reel or spool.

Figure 10:
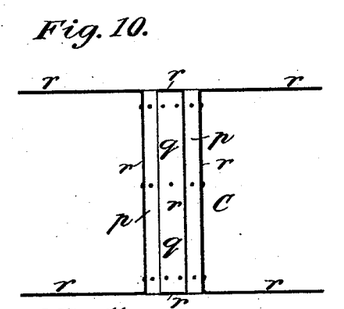
Figure 11:
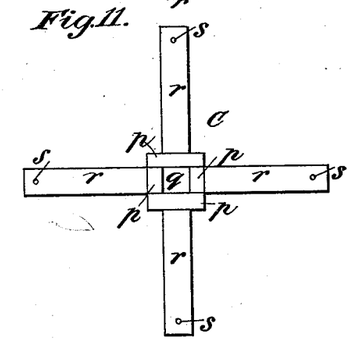
Figure 12:
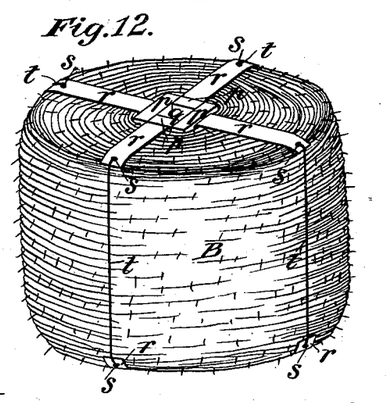

According to a further part of our invention we form the reel or spool of pieces of wood so nailed or otherwise secured together that a square, triangular, or polygonal opening or hole is formed. To the frame, body, or trunk so formed we secure either alone or in addition to cross-pieces of wood nailed or otherwise secured to the said frame, body, or trunk bars formed of thin metal and having their ends bent outward from the frame, body, or trunk, so as to act as flanges, between which the barbed wire or barbed, pronged, or spiked band or strip of metal for fencing or other purposes is coiled or wound. We form holes through the ends of the said bars, so that after the barbed wire or barbed, pronged, or spiked band or strip of metal for fencing or other purposes has been coiled upon the reel or spool the ends of each bar of thin metal may be connected or secured together by means of a hoop or hoops or a piece or pieces of wire, cord, string, or rope, or other suitable means passed through the holes in the ends of the said bar and outside the coil of barbed wire or barbed, pronged, or spiked band or strip of metal, or by means of a rivet passed through the said holes. In order to coil or wind barbed wire, or a barbed, pronged, or spiked band or strip of metal for fencing or other purposes upon a reel or spool provided with a frame, trunk, or body formed as above described, we mount such reel or spool upon a spindle formed of a square, triangular, polygonal, or other shape to correspond with the square, triangular, or polygonal opening or hole in the frame, trunk, or body aforesaid. This part of our invention is illustrated by Figs. 10 and 11 of the accompanying drawings, Fig. 10 being an elevation, and Fig. 11 a plan, of that which is shown in Fig. 10. We form the reel or spool of pieces $p\ p\ p\ p$ of wood so nailed or otherwise fastened together that a square, triangular, or polygonal opening $q$ is formed, according as four or three or five or more pieces $p$ of wood are employed. To the frame, body, or trunk C formed by the pieces $p$ of wood we secure bars $r$, formed of thin metal and having their ends bent outward from the frame, body, or trunk C, so as to act as flanges, between which the barbed wire or barbed, pronged, or spiked band or strip of metal for fencing or other purposes is coiled or wound. We form holes $s$ through the ends of the bars $r$, so that after the barbed wire or barbed, pronged, or spiked band or strip of metal for fencing or other purposes has been coiled or wound upon the reel or spool the ends of each bar $r$ may be connected or secured together by means of a hoop or hoops or a piece or pieces of wire, cord, string, or rope $t$, or other suitable means passed through the holes $r$ and outside the coil of barbed wire or barbed, pronged, or spiked band or strip of metal, as shown in Fig. 12, or we secure the ends of each of the bars $r$ together by means of a rivet passed through the holes $s$ in the said bar $r$. When a rivet is to be so employed, the ends of each bar $r$ must be made sufficiently long to overlap each other. Although we have only shown the frame, trunk, or body C of the reel or spool as being formed of four pieces $p\ p\ p\ p$ of wood, such frame, trunk, or body C may be made of three, five, or a greater number of pieces of wood $p$.

In order to coil or wind barbed wire or a barbed, pronged, or spiked band or strip of metal for fencing or other purposes upon a reel or spool provided with a frame, trunk, or body C, formed as above described, we mount such reel or spool upon a spindle formed of a square, triangular, polygonal, or other shape to correspond with the square, triangular, or polygonal opening or hole $q$ in the frame, trunk, or body C. In cases in which it may be desirable more than four of the bars $r$ may be employed in one reel or spool.

The bars $r$ which we employ are usually formed from what are known commercially as "sheets" or "hoops," but such bars may be formed of any suitable metal and in any suitable manner.

If it be desired a frame, trunk, or body formed as above described may be provided at each end with a cross-piece of wood and a plate or plates formed of sheet metal and provided at each end with a hole through which a hoop or hoops, or a piece or pieces of wire, cord, string, or rope, or other suitable means may be passed, so that the metal plates of the reel or spool may be rendered better able to withstand any strain put upon them when the reel or spool is being handled, and so that the barbed wire or barbed, pronged, or spiked band or strip of metal upon the reel or spool may be prevented from becoming uncoiled.

Figure 13:
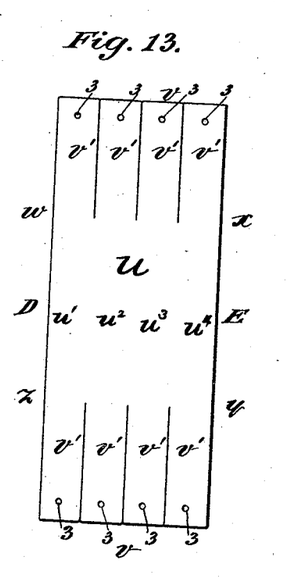
Figs. 13 and 15 are views illustrating the formation of certain reels or spools according to our invention.
Figure 14:
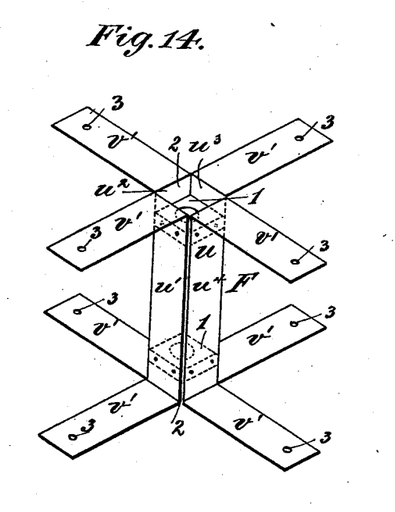

A further part of our invention is shown in Figs. 13 and 14 of the accompanying drawings, Fig. 13 showing a sheet of metal of which a reel or spool is to be formed, and Fig. 14 showing the reel or spool formed from the sheet of metal shown by Fig. 13. We take a piece of sheet metal of suitable length, the breadth of which in the direction of the line D E will, when folded, form the four sides $u'$ $u^2\ u^3\ u^4$ of the barrel $u$ of the reel or spool F. Each of the opposite ends $v\ v$ of the sheet of metal we divide into four strips $v'$, each of which strips $v'$ is of the length of one of the arms $v'$ with which the reel or spool is to be provided. The sheet of metal is then folded so that the central portion $w\ x\ y\ z$ of the sheet of metal will form the square barrel $u$ of the reel or spool F, the portion $w\ x\ y\ z$ of the sheet of metal being previously made of a length equal to that of the square barrel $u$ of the reel or spool to be formed. The strips of metal $v'$ are bent, so that each strip $v'$ shall be at right angles to the barrel $u$ of the reel or spool, as shown in Fig. 14. We may insert square blocks of wood—such as 1—inside the barrel $u$ of the bobbin or reel F and secure such blocks 1 in position in the barrel $u$ by means of nails or other convenient means. The blocks 1 of wood serve to strengthen the reel or spool and to keep the reel or spool F in position upon the spindle upon which the reel or spool is carried when barbed wire, or a barbed, pronged, or spiked band or strip of metal for fencing or for other purposes is being coiled upon the reel or spool F. When the barbed wire or barbed, pronged, or spiked band or strip of metal for fencing or other purposes is being coiled upon the reel or spool F, we drive such reel or spool F by means of a square or other suitable block or square or other suitable blocks secured upon the spindle of the machine, by means of which the barbed wire or barbed, pronged, or spiked band or strip of metal is coiled upon the reel or spool F. The said block or blocks passes or pass into the recess or recesses 2, formed at the end or ends of the said reel or spool F. We form holes 3 through the arms $v'$, so that after the barbed wire or barbed, pronged, or spiked band or strip of metal has been wound upon the reel or spool F, each of the arms $v'$ at one end of the reel or spool F may be connected or secured to the corresponding arm $v'$ at the other end of the reel or spool F by means of a hoop or hoops or a piece or pieces of wire, cord, string, or rope or other suitable means passed through the holes 3 in the arms $v'$ to be connected together and outside the coil of barbed wire or barbed, pronged, or spiked band or strip of metal, or by means of a rivet passed through the said holes 3. Instead of being formed with four arms v' at each end, as shown in Figs. 13 and 14, the reel or spool F may be provided at each end with three, five, or a greater number of arms v', the sheet of metal of which the reel or spool F is to be formed being made of suitable size and form.

Figure 15:
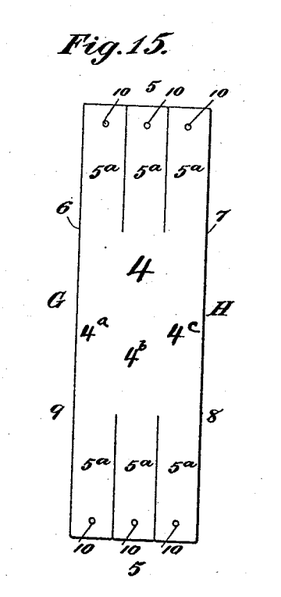
Figure 16:
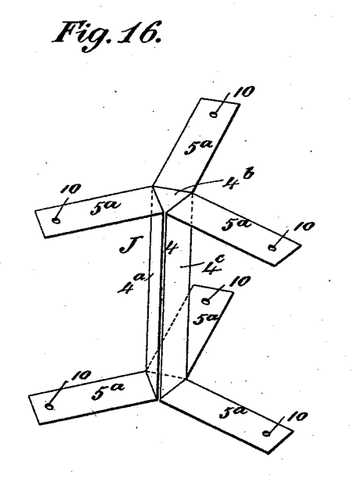

A further part of our invention is shown in Figs. 15 and 16 of the accompanying drawings. Fig. 15 shows the sheet of metal from which the reel or spool is to be formed, and Fig. 16 shows the reel or spool formed from the sheet of metal shown in Fig. 15. We take a piece of sheet metal the breadth of which in the direction of the line G H will, when folded, form the three sides $4^a$ $4^b$ $4^c$ of the barrel 4 of the reel or spool J. Each of the opposite ends 5 of the sheet of metal we divide into three strips $5^a$, each of which strips $5^a$ is of the length of one of the arms $5^a$ with which the reel or spool J is to be provided. The sheet of metal is then folded so that the central portion 6 7 8 9 of the sheet of metal will form the triangular barrel 4 of the reel or spool J, the portion 6 7 8 9 of the sheet of metal being previously made of a length equal to that of the triangular barrel 4 of the reel or spool J to be formed. The strips $5^a$ of metal are then bent, so that each strip $5^a$ shall be at right angles to the barrel 4 of the reel or spool J. When the barbed wire or barbed, pronged, or spiked band or strip of metal for fencing or other purposes is to be coiled upon the reel or spool J, formed as above described, we mount such reel or spool J upon a spindle, formed of a triangular section or other suitable section to correspond with the form of the interior of the barrel 4 of the spool or reel J. We form holes 10 through the arms $5^a$, so that after the barbed wire or barbed, pronged, or spiked band or strip of metal has been wound upon the reel or spool J each of the arms $5^a$ at one end of the reel or spool J may be connected or secured to the corresponding arm $5^a$ at the other end of the reel or spool J by means of a hoop or hoops or a piece or pieces of wire, cord, string, or rope or other suitable means, passed through the holes 10 in the arms $5^a$ to be connected together, and outside the coil of barbed wire or barbed, pronged, or spiked band or strip of metal, or by means of a rivet passed through the said holes 10. Instead of being formed with three arms $5^a$ at each end, as shown in Figs. 15 and 16, the reel or spool J may be provided at each end with four or more arms, the sheet of metal of which the reel or spool J is to be formed being made of suitable size and form.

Having now particularly described and ascertained the nature of our said invention, and in what manner the same is to be performed, we declare that what we claim is—

1. A reel or spool for holding barbed wire or barbed, pronged, or spiked bands or strips of metal for fencing or other purposes, consisting of a body portion adapted to receive a spindle, and end portions extending substantially at right angles to the body portion, and consisting of flexible material provided with points of attachment for a binding cord or wire, and adapted, together with said cord or wire, to enwrap the coil when completed, substantially as set forth.

2. A reel or spool for holding barbed wire or barbed, pronged, or spiked bands or strips of metal for fencing or other purposes, comprising a body portion adapted to receive a spindle, and end portions formed integral with and projecting substantially at right angles to the body portion in the form of arms, said end portions being formed of flexible metal and provided with retaining-points for the attachment thereto of a binding cord or wire, substantially as set forth.

3. A reel or spool for holding barbed wire or barbed, pronged, or spiked bands or strips of metal for fencing or other purposes, comprising a body portion terminating at its ends in arms projecting substantially at right angles thereto and formed of flexible metal, and a wooden core within the said body portion, said body portion being fitted to receive a spindle, and said flexible arms being provided with retaining-points for attachment thereto of a binding wire or cord, substantially as set forth.

JAMES BERESFORD.
JOSEPH PHILLIPS BEDSON.

Witnesses:
ALBERT E. WALL,
  *U. S. Consulate, Manchester, England.*
W. T. CHEETHAM,
  *18 St. Ann's Street, Manchester.*